UNITED STATES PATENT OFFICE.

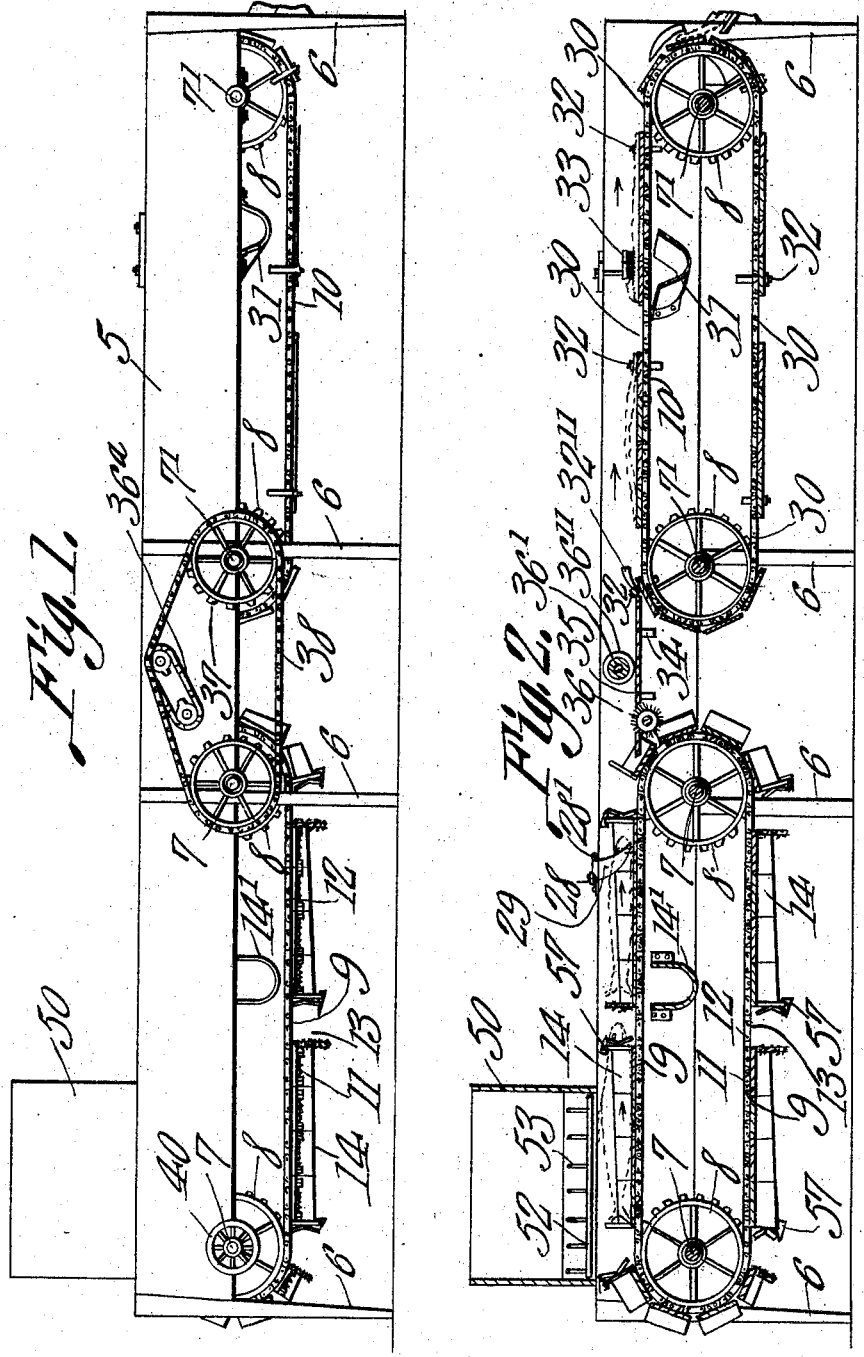

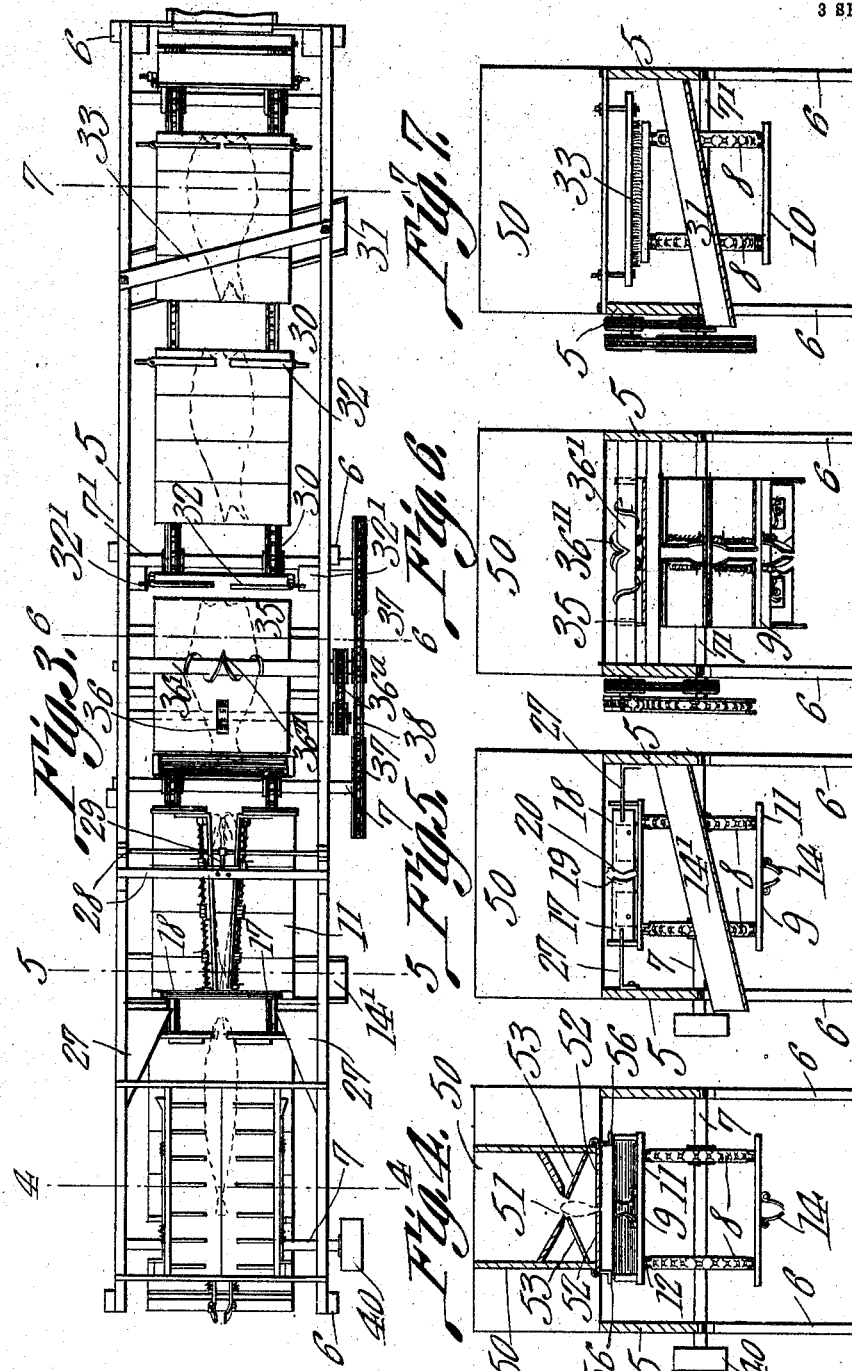

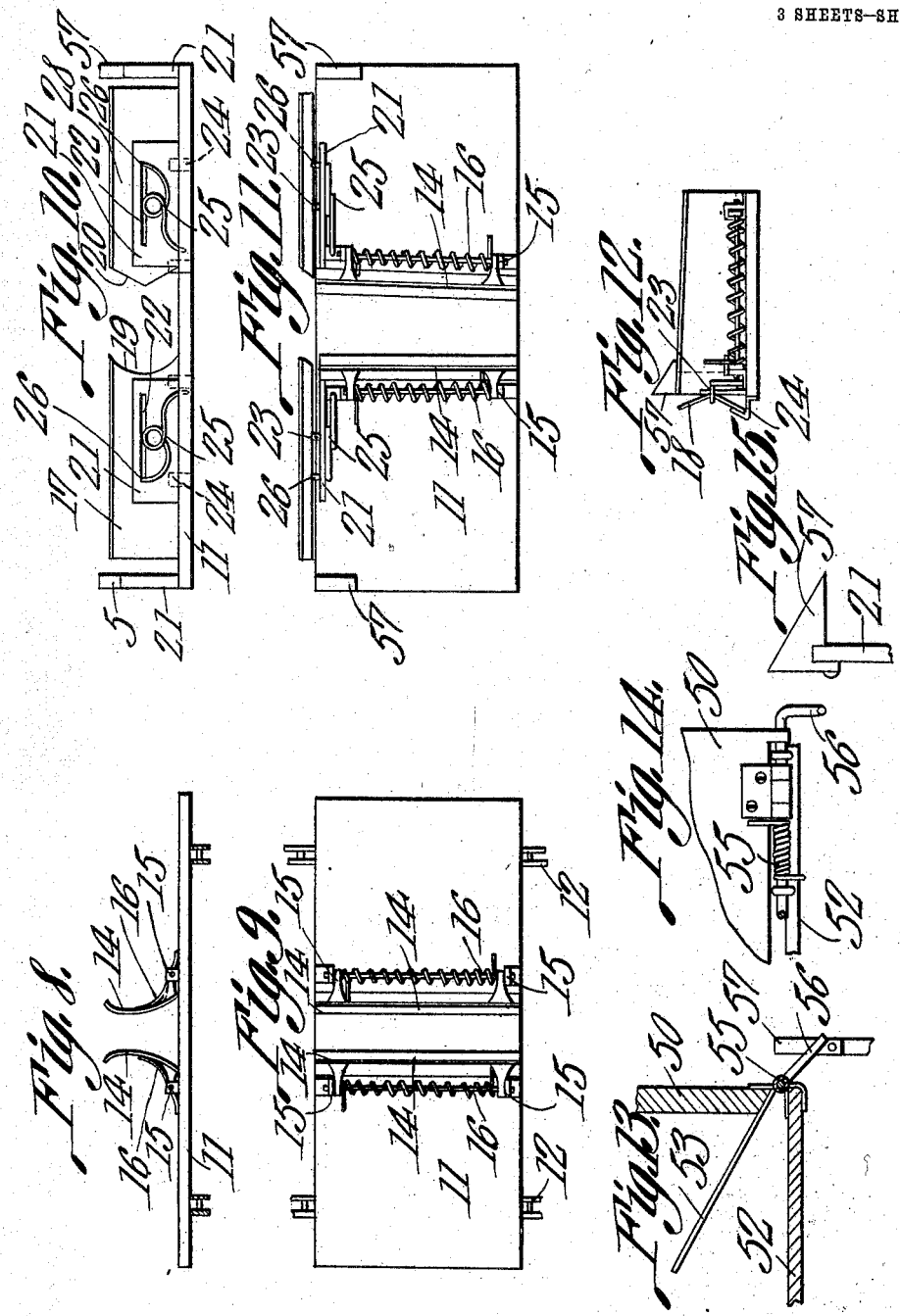

ALVIN W. EDDY, OF FORD RIVER, MICHIGAN.

FISH-CLEANING MACHINE.

981,075.  Specification of Letters Patent.  Patented Jan. 10, 1911.

Application filed June 21, 1910. Serial No. 568,184.

*To all whom it may concern:*

Be it known that I, ALVIN W. EDDY, a citizen of the United States, residing at Ford River, in the county of Delta and State of Michigan, have invented a new and useful Fish-Cleaning Machine, of which the following is a specification.

This invention relates to fish cleaning machines and has for its object to provide a strong, durable and thoroughly efficient machine of the character described especially designed for cleaning and dressing herring, mackerel, and other fish preparatory to salting the same.

A further object of the invention is to provide a machine including means for removing the head of the fish, splitting the fish down the back, and subsequently spreading the fish and removing the entrails thereof.

A further object is to provide a machine having spaced conveyers mounted for travel in the same direction and upon which are supported the fish to be cleaned and dressed, one of said conveyers being provided with coacting decapitating blades which extend into the path of movement of suitable cams mounted on the supporting frame for actuating said blades at predetermined intervals.

A still further object of the invention is generally to improve this class of machines so as to increase their durability and efficiency.

Further objects will appear in the following description, it being understood that various changes in the form, proportion, size and minor details of the device may be resorted to without departing from the spirit of the invention.

In the accompanying drawings forming a part of this specification:—Figure 1 is a side elevation of a fish cleaning and dressing machine constructed in accordance with my invention. Fig. 2 is a longitudinal sectional view of the same. Fig. 3 is a top plan view. Fig. 4 is a transverse sectional view taken on the line 4—4 of Fig. 3, and looking in the direction of the arrow. Fig. 5 is a transverse sectional view taken on the line 5—5, Fig. 3 and looking in the direction of the arrow. Fig. 6 is a transverse sectional view taken on the line 6—6 of Fig. 3 and looking in the direction of the arrow. Fig. 7 is a section on the line 7—7 of Fig. 3. Fig. 8 is a detail transverse sectional view of the fish holding clamp showing one of the transverse bars of the conveyer in elevation. Fig. 9 is a top plan view of Fig. 8. Fig. 10 is a side elevation of the coacting decapitating knives and the adjacent transverse bar of the conveyer. Fig. 11 is a top plan view of Fig. 10. Fig. 12 is a transverse sectional view taken through one of the sliding knives and showing the fish holding means in side elevation. Figs. 13 and 14 are detail views at right angles to each other, showing the cam operated means for operating the doors at the bottom of the fish hopper. Fig. 15 is a detail view of one of the cams for opening the fish hopper.

Similar numerals of reference are employed to designate corresponding parts throughout.

The improved fish cleaning machine forming the subject matter of the present invention includes an elongated open-ended supporting frame comprising spaced side members 5 to which are secured in any suitable manner depending legs or feet 6, which latter serve to support the lower longitudinal edges of the side members in the elevated position, as shown.

Journaled in the side members are a plurality of sets of transverse shafts 7—7 and 7'—7' upon which are mounted for rotation sprocket wheels 8 carrying conveyers 9 and 10. The conveyer 9 is made up of a plurality of sets of transverse bars 11 to which are secured the sprocket chains 12, the several sets of bars being spaced apart to form openings 13 which successively register with an inclined trough 14', Fig. 5, as the conveyer travels for the purpose of allowing the heads of the fish to be deposited into a suitable receptacle, (not shown) as will be more fully explained hereinafter.

Secured to each transverse bar 11 on the conveyer 9, is a pair of coacting yieldingly supported plates 14, Figs. 8 and 9, preferably curved and arranged at a slight angle to each other, so as to present a wedge-shaped pocket or compartment for the reception of the fish. These plates 14 are pivotally mounted at 15 on the transverse bar 11 and are normally and yieldingly supported in close proximity to each other by coil springs 16, one end of each of which bears against the transverse bar 11, while the opposite end thereof bears against the clamping plate 14 above the adjacent pivot 15, as best shown in Fig. 9 of the drawings.

Carried by the forward transverse bar 11 of each set or group of bars 11 is a pair of coacting decapitating knives or blades 17 and 18 which are angular in cross section, Fig. 10, the blade 17 being formed with a concave face 19, Fig. 10, which bears against and holds the head of the fish, while the pointed cutting edge 20 of the mating knife or blade 18 severs the head of the fish, after which the latter drops into the chute 14'.

To guide the knives 17 and 18 there are secured, in any suitable manner to the bar 11 vertically disposed plates 21, Figs. 10 and 12, having longitudinally disposed slots 22 formed in the upper ends thereof which receive guide pins 23 extending laterally from the adjacent cutting blades, 17 and 18, thereby to assist in guiding said blades as the latter are moved toward and from each other. Suitable brackets 24, Fig. 12, are also secured to the adjacent transverse bars 11 for the purpose of guiding the lower longitudinal edges of the cutting blades during the operation of the latter. The cutting blades 17 and 18 may be flat and disposed in a vertical plane but it is preferred to have said blades slightly angular in cross section, as shown, so as to conform to the approximate shape of the gills of the fish, and thus permit the severance of the head without undue waste.

The means for separating the knives 17 and 18 will now be described. Mounted on the transverse bar 11 which carries cutting blades 17 and 18 are coiled springs 25, Fig. 10, one end of each of which is secured to the bar 11, while the opposite end thereof is bent laterally at 26 and extends through the adjacent longitudinal slots 22 for engagement with the adjacent cutting blade or knife. The tendency of the springs 25 is normally to hold the cutting blades separated so as to permit the introduction of the fish, said cutting blades being movable to operative position by engaging with suitable cams 27 mounted on the supporting frame, as best shown in Fig. 3 of the drawings. The cams 27 are arranged in the path of movement of the cutting blades 17 and 18, so that as the conveyer 9 travels in the direction of the conveyer 10, the rear ends of said cutting blades will engage the inclined faces of the cams 27, and thus force said blades together and sever the head of the fish, the springs 25 serving to automatically return the active faces of the cutting blades to normal or separated position after the passage of the cutting blades beyond the cams 27. Extending transversely across the supporting frame and connecting the side walls thereof above the conveyer 9 is a pair of supports or rods 28 and 28' upon which is mounted an adjustable splitting knife 29 which engages the back of the fish and splits said fish, so as to expose the entrails of the latter as said fish travels on the conveyer. The conveyer 10 is also preferably formed of a series of transverse bars arranged in sets, each set being spaced apart to form an opening or recess 30 adapted to successively register with a trough or chute 31 similar in construction to the trough or chute 14'. Each set of transverse bars comprising the conveyer 10 is provided with a pair of spring operated clamping devices 32 adapted to engage the fish and prevent accidental displacement of the latter during the passage of the fish beneath the cleaning brush 33. The springs of the clamping devices 32 may be arranged in any suitable and well known manner. The cleaning brush 33 is disposed above the conveyer 10 and is secured in any suitable manner to the side walls of the supporting frame, said brush being provided with depending bristles adapted to sweep the entrails of the fish through the adjacent opening into the trough 31 during the passage of the fish on the conveyer and beneath said brush. The springs of the clamping devices or arms 32 hold them normally in engagement with the split fish. Said clamps are raised to receive the fish from the spreading table 35, by means such as the suitably mounted cams 32' which engage the outer ends of the members 32 and raise them while the fish is moving into position thereunder.

The inner ends of the conveyers 9 and 10 are spaced apart and mounted on supports 34 interposed and between said conveyers is a spreading table 35. The spreading table 35 is provided with a spiked feed roller 36 disposed in alinement with the fish holding plates 14, so as to engage the fish and feed it to a spreading roller 36' having a spreading fin 36", Fig. 3, after leaving the roller 36" which spreads it flat, the fish is engaged by the clamps 32, that the entrails of the fish may be readily removed by the action of the brush 33.

The inner stub shafts 7 and 7' of each conveyer is extended longitudinally beyond the adjacent side of the supporting frame and is provided with a sprocket wheel 37 for engagement with a sprocket chain 38, so that both conveyers may be rotated in the same direction. The rollers 36 and 36' are operated by a chain 36ª.

The machine may be operated manually or if desired the latter may be connected with an engine or other suitable source of power through the medium of a belt engaging a wheel or pulley 40.

The fish are placed in a hopper 50, Figs. 2 and 4, arranged over the first conveyer, and slip one at a time through the bottom opening 51 therein. The hopper is provided with bottom doors 52—52 having rigid upwardly extending arms 53. When the hopper doors 52 are opened to permit the fish to fall into the clamping members 14, the arms 53 move into horizontal position and thus prevent the next fish from dropping out of the hopper. As shown in Figs. 13 and 14, the doors 52 are normally held closed by means of coil springs 55, and are provided with rigid arms 56 which are engaged and raised at the proper moment by cams 57 secured on the plates 21 of the conveyer, thus lowering the doors and permitting a fish to drop onto the conveyer. In operation the fish are thus positioned in the pockets formed by the clamping plates 14 with the head thereof extending between the cutting edges of the blades 17 and 18. The conveyers are then rotated either manually or from any suitable source of power which causes the outer ends of the cutting blades to bear against the cams 27, and thus force the blades inwardly, so as to sever the head of the fish, which latter drops into the inclined trough 14′ and thence into a suitable receptacle designed to receive the same. A further movement of the conveyer will present the back of the fish to the splitting knife 29, so as to split the back of the fish which will then be presented to the feed roller 36 and spreading member 36′ in the manner before stated. After the fish has been spread open by the member 36′ the clamping plates or arms 32 of the conveyer 10 will engage and cause the fish to travel beneath the brush 33, so that the fish may be cleaned and dressed and the debris deposited in the chute 31. The machine may be provided with any number of conveyers, so that any desired number of fish may be operated upon at one time.

From the foregoing description, it is thought that the construction and operation of the device will be readily understood by those skilled in the art, and further description thereof is deemed unnecessary.

Having thus described the invention, what is claimed is:—

1. A fish cleaning machine including a supporting frame, spaced conveyers mounted for rotation in the frame and adapted to receive and support a fish, coacting decapitating knives carried by one of the conveyers, means carried by the frame for actuating the decapitating knives, and a spreading member interposed between the conveyers.

2. A fish cleaning machine including a supporting frame, spaced conveyers mounted for rotation on the frame, coacting decapitating knives carried by one of the conveyers, means mounted on the frame and extending in the path of movement of the knives for actuating the latter, a splitting knife arranged above said conveyer, a cleaning brush arranged above the other conveyer, and a spreading member interposed between said conveyers.

3. A fish cleaning machine including a supporting frame, spaced conveyers mounted for rotation on the frame, spring actuated clamping members carried by one of the conveyers and spaced apart to form a pocket for the reception of the fish, coacting decapitating knives carried by said conveyer, means mounted on the supporting frame for actuating the knives, a cleaning brush disposed above the other conveyer, and a spreading member interposed between said conveyers.

4. A fish cleaning machine including a supporting frame, spaced conveyers mounted for rotation on the supporting frame, fish holding members carried by both of the conveyers, coacting decapitating knives carried by the clamp carrying conveyer, a splitting knife, a cleaning brush disposed above the last mentioned conveyer, and a spreading member interposed between said conveyers.

5. A fish cleaning machine including a supporting frame, spaced conveyers mounted for rotation in the frame, fish clamping members carried by one of the conveyers and spaced apart to form inclined pockets, coacting spring actuated knives disposed at the large end of each pocket, cams carried by the supporting frame adapted to engage and actuate the knives, fish clamping means carried by the other conveyer, and a spreading roller interposed between the conveyers and provided with a fin.

6. A fish cleaning machine including a supporting frame, a conveyer mounted for rotation in said frame, spring pressed clamping members mounted on the conveyer and spaced apart to form fish receiving pockets, coacting laterally concaved decapitating knives slidably mounted on the conveyer, and cams secured to the supporting frame and adapted to engage and actuate the decapitating knives.

7. A fish cleaning machine including a supporting frame, a conveyer mounted for rotation in said frame and comprising a plurality of spaced transverse bars, spring pressed clamping members secured to said bars and spaced apart to form a pocket for the reception of the fish, coacting decapitating knives slidably mounted on one of the bars of the conveyer, springs connecting the knives and the adjacent bar for normally holding the knives in inoperative position, and means carried by the supporting frame and extended into the path of movement of the knives for moving the latter to operative position.

8. A fish cleaning machine including a supporting frame, a conveyer mounted for rotation on the frame and comprising a plurality of sets of transverse bars, one set of bars being spaced from the adjacent set to form an opening, spring pressed clamping plates secured to the bars of each set and spaced apart to form a tapered fish receiving pocket, coacting laterally concaved decapitating knives slidably mounted on one of the bars of each set and movable to operative position at the large end of each fish receiving pocket, and cams mounted on the supporting frame and adapted to engage and actuate the decapitating knives.

9. A fish cleaning machine including a supporting frame, troughs discharging through one side of the frame, spaced conveyers mounted for rotation within the frame and each formed of a plurality of transverse bars arranged in sets, the sets of bars constituting each conveyer being spaced apart to form openings adapted to register with the adjacent troughs, spring actuated clamping plates carried by the bars of one set and spaced apart to form pockets for the reception of fish, coacting spring pressed decapitating knives carried by each set of bars, a splitting knife disposed above one of the conveyers, fish clamps carried by the transverse bars of the other conveyer, a cleaning brush arranged above the last named conveyer, a feed roller and a spread-in roller interposed between the conveyers and having a fin adapted to engage the fish and spread the latter before it reaches the fish clamps.

10. In a fish cleaning machine, a supporting frame, a conveyer mounted for rotation in said frame and formed of a plurality of transverse bars arranged in sets, said sets being spaced apart to form intermediate openings, plates secured to the ends of the bars of each set and having longitudinal slots formed therein, spring actuated decapitating knives bearing against the plates and provided with guide pins operating within the adjacent slots, springs extending through said slots for engagement with the adjacent knives, and cams carried by the supporting frame and adapted to engage and actuate the knives.

11. A fish cleaning machine including a supporting frame, a discharge chute carried by the frame, a conveyer mounted for rotation within the frame and formed of a plurality of sets of transverse bars, the bars of the several sets being spaced apart to form intermediate openings adapted to register with the chute, vertically disposed slotted plates secured to one of the bars of each set, coacting laterally concaved decapitating knives slidably mounted on the plates, guide pins carried by the knives and extending through the said slots, springs each having one end thereof secured to the adjacent bar and its opposite end extending through the slot in the plate for engagement with the adjacent decapitating knife, brackets forming guides for the lower longitudinal edges of the knives, and blocks having inclined faces secured to the supporting frame and adapted to engage and actuate the knives.

In testimony that I claim the foregoing as my own, I have hereto affixed my signature in the presence of two witnesses.

ALVIN W. EDDY.

Witnesses:
H. I. SHARP,
JOHN J. BARTELLO.